Feb. 11, 1930.  H. E. BUCKLEN  1,746,991
ELECTRIC WINDMILL
Filed Sept. 20, 1928  4 Sheets-Sheet 1
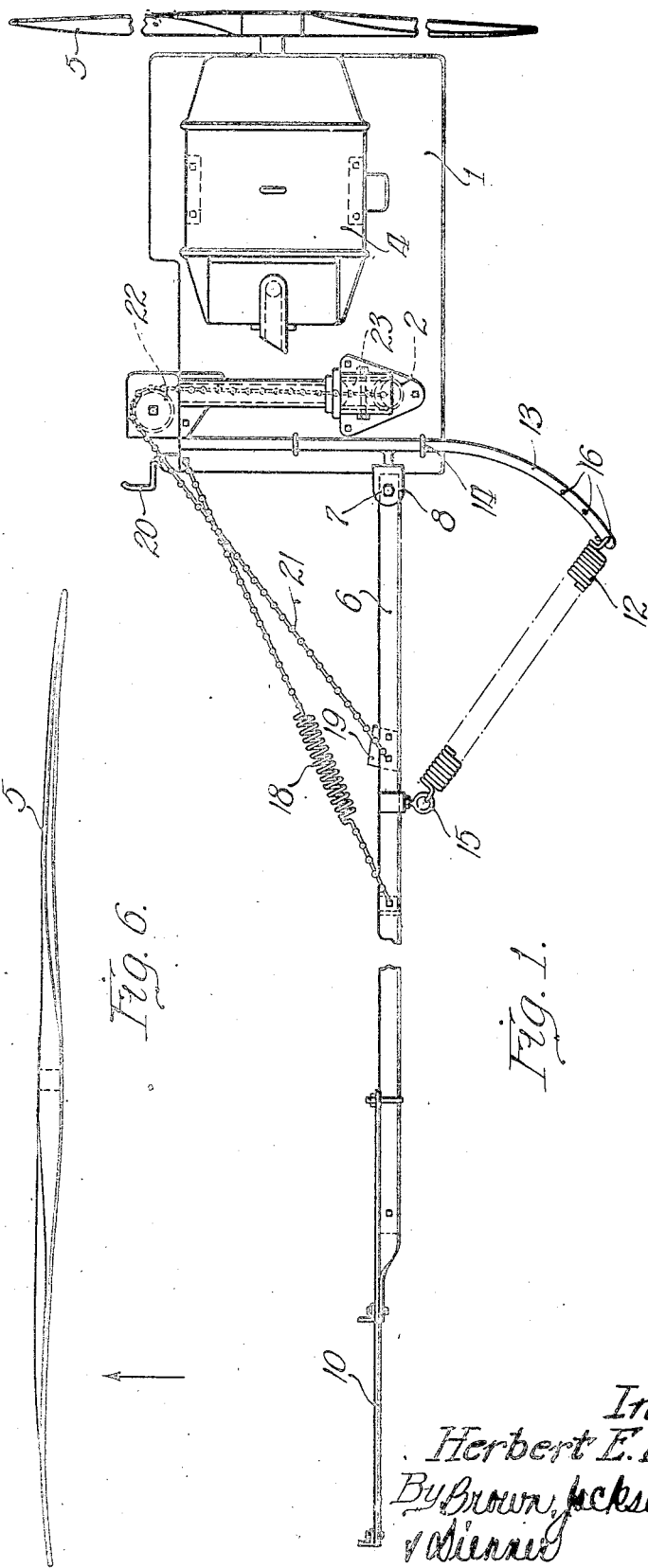
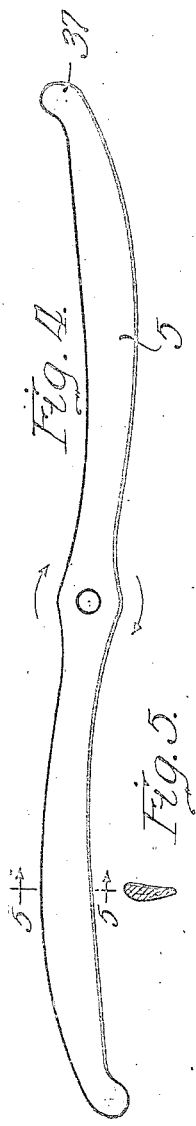
Inventor
Herbert E. Bucklen
By Brown, Jackson, Boettcher
 & Dienner
Atty's Feb. 11, 1930.　　　H. E. BUCKLEN　　　1,746,991
ELECTRIC WINDMILL
Filed Sept. 20, 1928　　　4 Sheets-Sheet 2
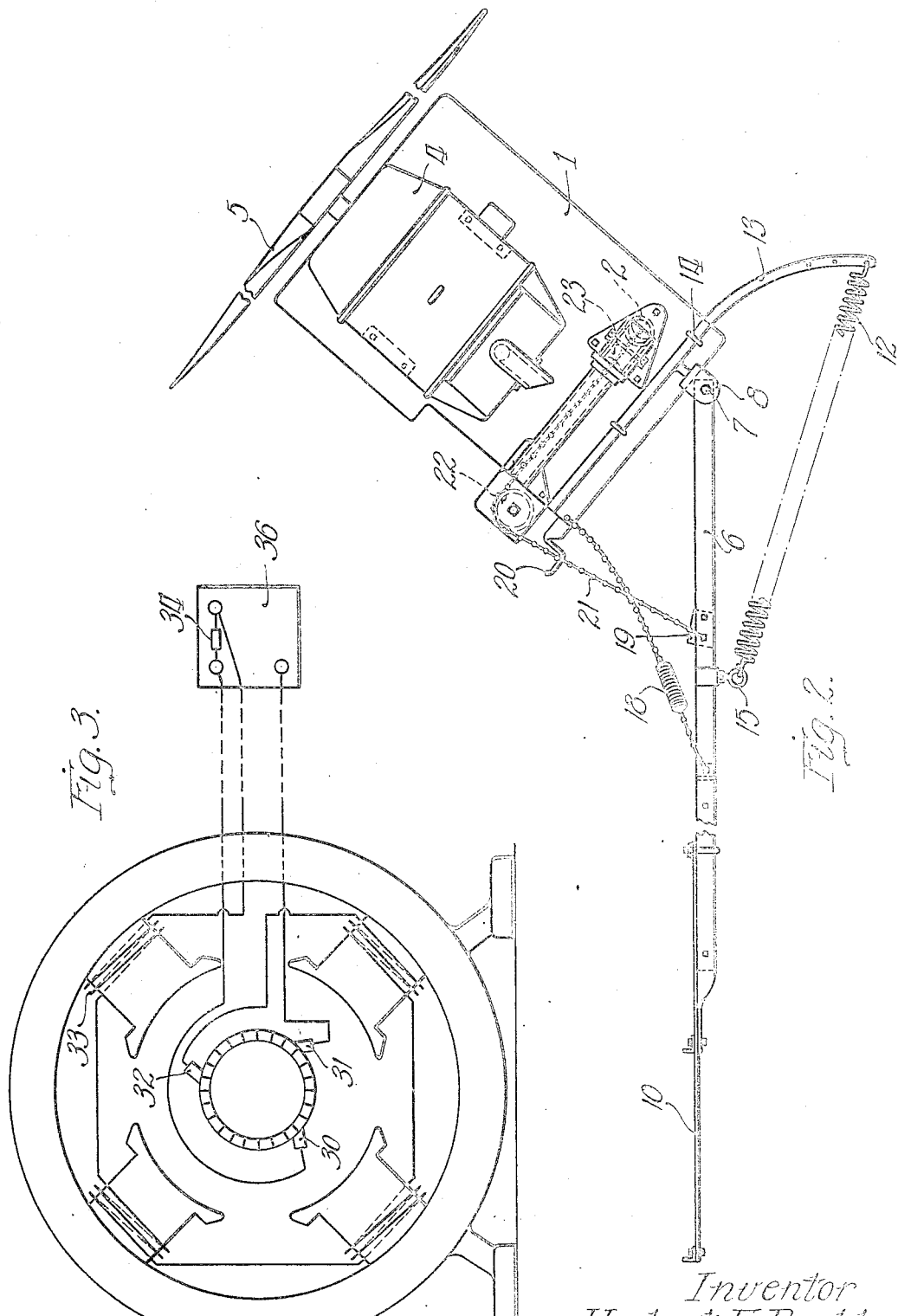
Inventor
Herbert E. Bucklen
By Brown, Jackson, Boettcher & Dienner
Atty's

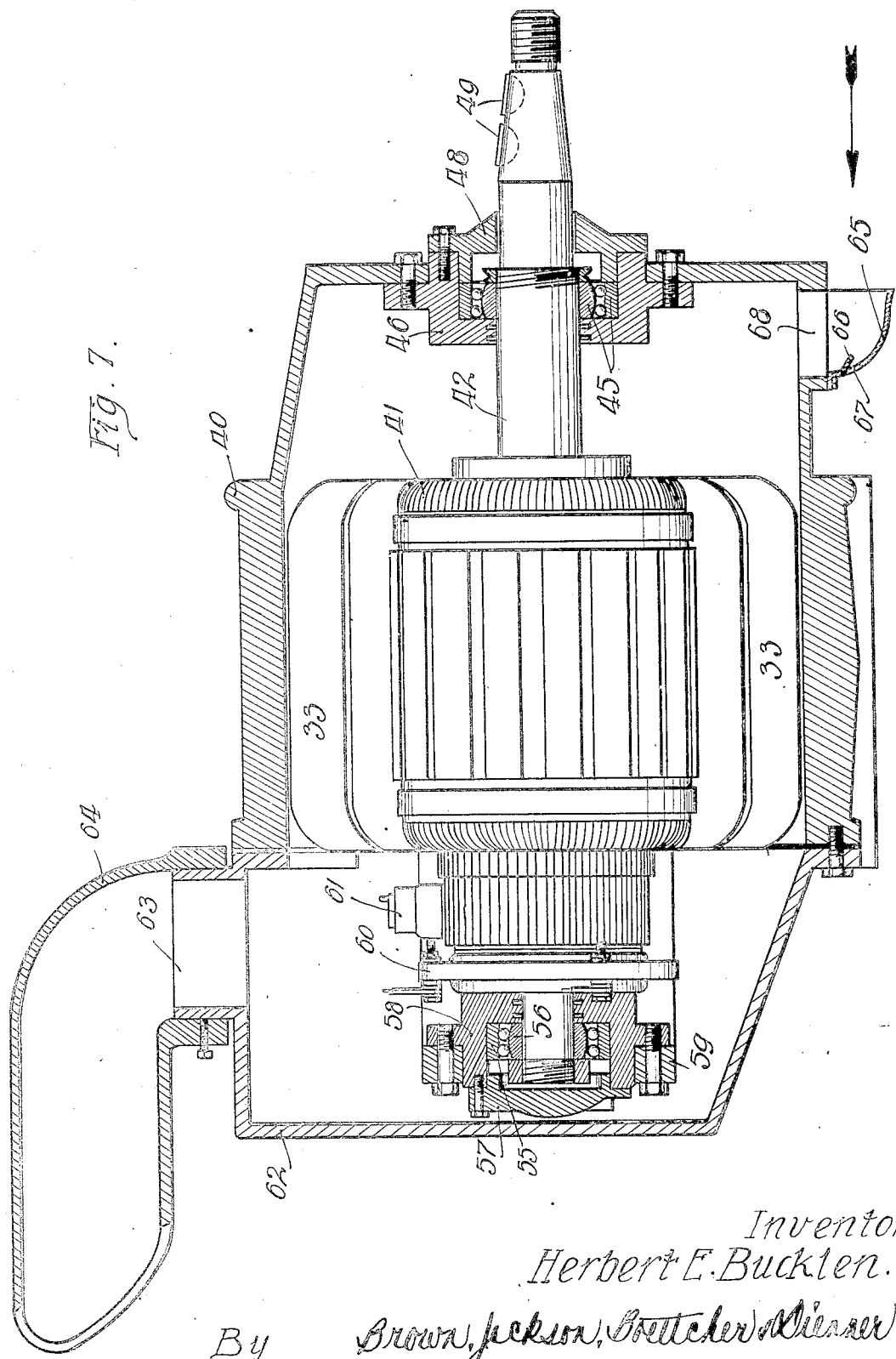

Feb. 11, 1930.  H. E. BUCKLEN  1,746,991
ELECTRIC WINDMILL
Filed Sept. 20, 1928  4 Sheets-Sheet 4

Inventor:
Herbert E. Bucklen.
By Brown, Jackson, Boettcher & Dienner
Attys.

Patented Feb. 11, 1930

1,746,991

UNITED STATES PATENT OFFICE

HERBERT E. BUCKLEN, OF ELKHART, INDIANA, ASSIGNOR TO HERBERT E. BUCKLEN CORPORATION, A CORPORATION OF INDIANA

ELECTRIC WINDMILL

Application filed September 20, 1928. Serial No. 307,112.

My invention relates to wind driven electric power plants, such as are commonly used in isolated places where electricity must be generated locally if it is to be had at all.

A wind driven power plant generally consists of a wind driven wheel mounted on top of a supporting tower and connected to an electric generator which may be mounted adjacent to the wind wheel on top of the tower, although not always so mounted. Power plants of this kind should be so constructed that they can be started and operated by winds of low velocity, say three to six miles per hour. If this were not so, the generator would be idle for a large portion of the time. The plant must also be designed so as to be able to withstand the enormous destructive pressures that result when high winds of tornado-like velocity are encountered. While it may not be exceedingly difficult to construct a windmill that will satisfy either of those requirements alone, a good deal of difficulty is encountered in constructing a windmill that will satisfy both requirements, since the requirements are, in many ways, conflicting.

To save the windmill from destruction by high winds, it has been customary to provide a tail vane governor which is acted on by the wind and serves to turn the windmill out of the wind as the wind velocity increases. This provision, taken by itself, is satisfactory only when the change in the wind velocity is gradual. This is not always the case with tornadoes. It frequently happens, during tornadoes, that the velocity or direction of the wind changes almost instantly without any previous indication of the coming change. When this is the case, the windmill may happen to be head on in the wind and before the tail vane can swing it out of the wind the entire apparatus may be destroyed. If the windmill is made rugged enough to withstand the pressures involved under the above conditions, it is generally found to be too heavy to be started by low velocity winds.

As pointed out in the pending application, Serial No. 168,492, filed February 16, 1927, I have invented a light weight high speed screw impeller of the aeroplane type which can be started by a low wind and which offers a small area to the wind whereby it can withstand the pressures resulting from very high winds. This would seem to be a solution to the problem. However, it has been found that certain other difficulties are encountered. Aeroplane type impellers such as are here considered can derive full benefit from winds of a very high velocity and can operate at a very high speed. Since this is the case, a tornado-like wind will not destroy the impeller but will operate it at a very high speed and if the electric generator driven thereby is of the shunt field type, as is usually the case, excessive voltages will be generated, resulting very frequently in the injury of the generator.

To overcome this difficulty protective relays have in the past been connected to the generator for the purpose of preventing the generation of excessive voltages. Delicate relays are generally objectionable where a skilled attendant is seldom, if ever, available. The introduction of protective relays introduces just one more place where a breakdown may occur and a failure of the relay may result in the destruction of the plant. To overcome the above difficulties I provide a wind driven electric generating plant of the kind driven by a two-bladed impeller such as shown in the prior application above referred to, with a generator which cannot generate destructive voltages when the wind wheel is operating at an excessively high speed.

I have discovered that certain characteristics of the third-brush generator render it very desirable for use with a wind wheel, especially a wheel having a low breakaway torque and capable of attaining a very high speed. A generator of this kind has practically zero output below a certain speed, and as the speed increases above a certain amount the output of the generator rises very rapidly until the maximum output for the particular generator is reached, beyond which a further increase in speed results in a gradual decrease in the output. Since the output is practically zero for speeds below a certain amount, the opposing torque at those speeds is, of course, very low. In a wind operated power plant utilizing a propeller of the kind here contemplated, this characteristic is of great importance in that the impeller is thereby enabled to start at a lower wind speed. An impeller having only two comparatively narrow blades offers very little surface to the wind; hence there is difficulty in getting started at low winds.

Once the propeller starts rotating, it can continue, but with a load such as is imposed by the ordinary shunt wound generator, there is an appreciable opposing torque, due to which a higher wind velocity is needed to start the wind wheel than would be necessary in the absence of the opposing torque. With a third-brush generator, such as is here used, the torque opposing the starting of the wind wheel is reduced to a minimum, and, further, as the wheel gradually accelerates there is still very little opposing torque until a certain speed is reached. It is only when the impeller has accelerated to a certain point that the generator commences to be an appreciable load upon the impeller and from that point the output very rapidly increases as the speed of the wheel increases until the greatest generator output is reached. Due to this characteristic of the generator, the impeller is permitted to reach its greatest speed very much sooner than when the ordinary shunt wound generator is used.

One of the characteristics of the third-brush generator is that the voltage decreases as the speed with which the generator is driven increases beyond a certain point. This is a feature which, under certain conditions, is quite advantageous, but, under other conditions is undesirable.

This property of the generator serves to protect the generator against destroying itself by excessive voltages generated when the wind wheel is suddenly driven at a greatly increased speed by a sudden gust of wind during a tornado. This characteristic is, however, objectionable during the ordinary running of the generator, for if the generator were operating at its maximum rated output and if the speed of the wind wheel were to be increased by a slight amount, the output of the generator would be slightly reduced, thereby reducing the opposing torque of the generator upon the wind wheel.

This slight reduction in the opposing torque would tend to cause the wind wheel to increase its speed a little more, resulting in a further decrease in the output of the generator and in the opposing torque upon the wind wheel. The wind wheel would then tend to speed up still more. This process would continue until equilibrium would be reached. This may be at a generator speed such that the output is about sixty per cent of the output at the rated speed. It may occasionally happen that rather high winds prevail for a number of days. Under those conditions, with the ordinary third brush generator, the output of the power plant might be materially decreased over an extended period of time.

I have provided a way of eliminating the objectionable feature resulting from the tendency of a third brush generator decreasing its output as the speed increases, and at the same time retaining the protective advantage offered by this characteristic of the generator. This is accomplished by providing an angle tension governor to swing the wind wheel out of the wind when the wind velocity is such that the wheel tends to operate at a speed above its rated speed. The wheel is turned at an angle to the wind, the angle being such a function of the wind velocity that the wind wheel will be driven at approximately the same speed regardless of the velocity of the wind. By this arrangement the generator is operated at the rated speed even during strong wind storms. If, during a strong wind storm, the direction of the wind should suddenly change and the wheel should speed up before the governor could swing it out of the wind, the voltage of the generator falls rather than rises and the generator is not injured.

A short interval of time later the tail vane will have swung the wind wheel out of the wind into such a position that it again operates at its rated speed and the generator again generates the rated voltage. It is thus apparent that the generator is operated at its maximum efficiency during high wind storms without the danger of burning out the generator upon a sudden change in the direction of the velocity of the wind.

If a tail vane governor is relied upon exclusively to turn the wheel out of the wind it becomes necessary to have a rather sensitive governor which will remain accurate over long periods of time. This is so, for should the governor permit the wheel to remain in the wind when the wind is at a velocity greater than that required to drive the generator at the rated speed, the generator output is of course reduced, with the result that the wheel tends to further increase its speed. To overcome the necessity of a very accurate governor it is proposed that an impeller having flexible tips be used so that at low wind speeds the tips will derive the maximum benefit from the wind and at high speed the tips will be bent or flexed out of the wind not only to extract less power from the wind but also to actually impede the rotation of the propeller. By using such an impeller with a third brush generator it becomes practically impossible for the generator to be operated at a speed in excess of the rated speed for prolonged periods of time. Should a sudden gust of wind increase the speed materially, the impeller tips are flexed and thereby tend to reduce the speed to normal. The generator thereby tends to bring its output back to the normal output, during which time the governor may turn the impeller out of or at an angle to the wind.

In order to acquaint those skilled in the art with the manner of constructing and operating my invention, I shall describe in connection with the accompanying drawings a few specific embodiments of the same.

In the drawings, Fig. 1 is a plan view of a wind electric power plant embodying my invention.

Fig. 2 is a plan view of the plant showing the relative position of the parts when the impeller has been turned back and at an angle to the wind.

Fig. 3 is an end view of the generator showing the electrical connections.

Fig. 4 is an enlarged front elevation of the impeller.

Fig. 5 is a section taken on the line 5—5 of Fig. 4.

Fig. 6 is a side view of the impeller.

Fig. 7 is a sectional view of the generator and casing; and

Figure 8:
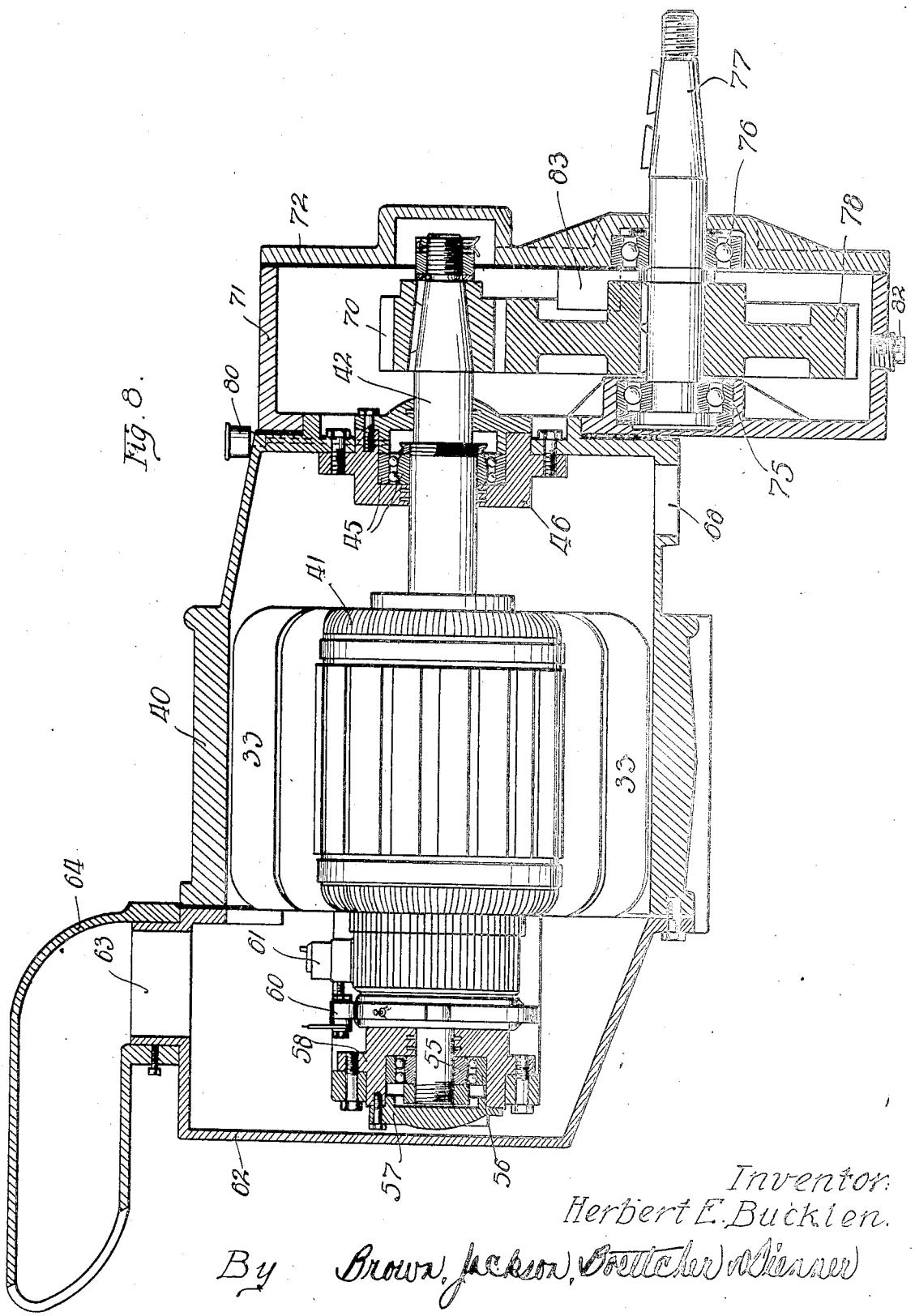
Fig. 8 is a sectional view of a modified form of generator casing wherein a step-up gear is used between the propeller and the generator.

Referring now more particularly to Figs. 1 and 2 of the drawing, 1 designates a turn table pivoted at the top of a supporting tower through a bearing 2 on a vertical shaft at one corner of the table. A generator 4 is mounted on the turn table 1 and has its axis offset from the axis provided by the bearing 2 and its vertical shaft by an amount determined by the size of the impeller or wind wheel 5 and the maximum load or output of the wind wheel. A movable tail vane is provided and consists of a rearwardly extending frame 6, having a pivotal connection through a vertical pin 7 and bracket 8 to the rear of the turn table 1, adjacent the fulcrum 2 thereof and carrying a wind vane 10 at its other end.

The angle tension spring 12 is connected at one end to an adjustable angle tension arm 13 which extends outwardly from one end of the turn table 1 and is suitably secured thereto by U-bolts 14. The other end of the spring 12 is connected to the tail vane frame through an adjustable eye bolt 5.

An increase in the wind pressure against the impeller 5 increases the speed of rotation thereof and, due to the fact that the frame is offset from the fulcrum of the turn table, it tends to force said impeller out of the wind and, simultaneously, through the medium of the spring 12 tends to swing the tail vane into the wind. This causes increased wind pressure on the wind side of the tail vane, thereby tending to force the tail vane out of the wind and against the action of the spring 12. The tension of the spring 12 may be adjusted at the bolt 15 and it may be adjusted at the angle tension arm 13 by inserting the end of the spring in any one of the holes 16 provided in the angle tension arm. The tension on the spring 12 is adjusted to such a value that the tail vane maintains the impeller in the wind at all wind velocities below that required for driving the impeller at a speed necessary to obtain the rated output of the generator. As the wind velocity increases, the speed of the impeller increases and the force tending to drive the impeller out of the wind increases.

With a given generator and a given wind wheel, it takes a certain wind velocity to operate the generator at its maximum output. The tension on the spring is adjusted to such a value that the wind wheel is maintained in the wind until that required wind velocity is reached. If the wind velocity increases, the turning moment tending to turn the table 1 about its axis 2 exceeds the opposing moment of the spring 12 and the turn table 1 commences to turn out of the wind. As it turns out of the wind, the tension on the spring 12 increases. The construction is such that the angle through which the table 1 is turned at any given wind velocity is the amount just necessary to maintain the speed of the propeller at its rated speed. Thus, the maximum generator output is maintained even though the wind velocity is such that the wind wheel would ordinarily be driven at a speed above the rated speed. Upon a sudden change in direction or velocity of the wind the speed of rotation of the wind wheel may be greatly increased. This will cause a decrease in the output of the generator. A very short interval of time later the tail vane governor will have turned the wind wheel out of the wind a proper amount necessary to decrease the speed of rotation of the wind wheel to its rated speed, thereby increasing the output of the generator to its normal maximum output.

With prolonged usage the spring 12 stretches and becomes weaker. The spring must then be reset so that the governor maintains the impeller in the wind until the rated maximum generator output is reached and so that the wind wheel is turned out of the wind by such an amount that the rated maximum generator output is maintained. Both the tension of the spring and the angle of pull may be adjusted.

With generators of this kind, unless a flexible tip impeller is used, it is particularly important to turn the wind wheel out of the wind, when the rated output is reached. This is so, for if the impeller were not turned out of the wind when the wind increases in speed beyond the critical speed of the generator, the wind wheel would rotate faster, resulting in a decrease in the output of the generator and, therefore, a decrease in the load on the impeller. This decrease of the load on the impeller would cause a further increase in the speed of the impeller, resulting in a further decrease in the output of the generator and, therefore, in the load on the propeller. This process would continue until equilibrium would be reached at what might be sixty per cent of the rated load, at which time the impeller would be operating at a great speed. By maintaining the wind wheel in the wind until the rated generator output is reached and then turning the wind wheel so that it occupies such an angle to the wind that the rated generator voltage is not exceeded, regardless of the velocity of the wind, the maximum output may be obtained from the generator over the greatest period of time.

The tail vane governor is provided with the usual vane cushioning spring 18 and bumper bracket 19, which cooperates with the bumper 20 on the turn table. There is also provided the usual pull out chain 21, which extends over the pulleys 22 and 23 and down the shaft that supports the turn table. The turn table carrying the generator and the propeller may be turned out of the wind, whenever desired, by pulling in the chain 21.

Figures 4 and 5 show an enlarged view of the impeller. At its outermost end the impeller is provided with flag tips 37 on the trailing side of the impeller. The entire impeller, and more especially the flag tips, is flexible and may be bent out of the wind. In the drawings the flag tips 37 have been exaggerated in order to more clearly indicate the same. In an actual impeller they are as a matter of fact a good deal smaller, since an eighth of an inch of twist distortion will cause a material slowing down of the revolving impeller.

A suitable flexible tipped impeller is shown in the prior application of myself and Harlie O. Putt, Serial No. 260,727, filed March 10th, 1928. While in that application the flag tips are bent backward away from the wind, in the present impeller the trailing flag tips are exactly in line with the rest of the propeller or as nearly so as in the case of an impeller having no flag tips. This may be seen from Fig. 6. The flag tips increase the starting torque at low wind speeds because of the large exposure of the flag tips and because of the leverage resulting from the fact that the tips are at the ends of the impeller. The entire impeller, which is of the helical screw type, is flexible, and under the action of high winds it uncoils slightly and thereby decreases its power absorbing ability.

The impeller is so constructed that the flag tips do not flex out of the wind until a velocity of about 21 miles per hour is reached, at which time the pressure on the tips is sufficient to flex them. The amount of flexing of the tips will be roughly proportional to the wind velocity in excess of twenty-one miles per hour, which in this case is assumed to be the wind velocity necessary to operate the generator at its rated speed. The tips bend backward at an angle to the plane of rotation of the impeller and thereby interfere with the rotation of the impeller. The amount of interference is of course proportional to the extent to which the tips are flexed. The greater the wind velocity the more the tips will flex and the more they will interfere with rotation of the impeller. By this arrangement it is possible to produce an impeller which actually decreases in speed upon a slight increase in wind velocity above a predetermined amount.

While I have here shown an impeller having trailing tips, this feature may be omitted by making the rest of the impeller more flexible. When this is done the flexing of the entire blade is relied upon to produce the retarding effect at high winds, whereas in the impeller shown the main retarding action is obtained at the flag tips although an appreciable retarding effect is also produced by the main body of the impeller. It is to be further noted that the flexing of the impeller changes the pitch thereof and lowers the amount of power that the impeller can extract from the wind.

It is found that a flexible impeller is rather quiet in its operation while a rigid propeller screeches a great deal when operated above a predetermined speed. I have found that the output of the impeller is increased as the noise is eliminated, and that the noise is eliminated by making the impeller flexible.

A flexible impeller, especially one such as is here shown, is particularly useful in a wind electric generating plant using a third brush generator in connection with a govoronor for turning the impeller out of the wind when the wind velocity increases beyond a predetermined amount. Consider this impeller operating under normal conditions and consider what would happen should the wind suddenly increase in velocity. Under these conditions there would be a sudden flexing of the tips 37 tending instantly to prevent the generator speed from increasing and permitting the angle tension governor to swing the impeller out of the wind. This further feature is also important in that without the flexible tips the angle tension governor must be very accurately adjusted if it is to be used in connection with a third brush generator. This is so, for should the governor be slightly out of adjustment and the impeller be driven at a speed in excess of the rated speed, the speed of the generator is, of course, decreased, thereby decreasing the opposing force on the impeller and permitting the impeller to rotate faster. This faster rotation will further decrease the opposing force of the generator upon the impeller, with the result that the impeller will further accelerate even through the wind velocity remains the same, namely, at a value slightly in excess of that necessary to actuate the governor.

Thus in a wind electric plant using a third brush generator, if the wind velocity is slightly in excess of that necessary to drive the generator at its rated speed and if the goveronor is slightly out of adjustment and fails to turn the propeller out of the wind, the impeller will speed up and drive the generator at such a speed that the output will fall as much as forty or fifty per cent. By the use of an impeller having flexible tips this is not possible, for under these conditions if the wind increases to a speed slightly in excess of that necessary to drive the impeller at its rated speed, the flexible tips bend backward and prevent an appreciable increase in speed of the impeller, with the result that if the governor fails to turn the impeller out of the wind, at that speed the impeller will increase in speed but slightly and will be held at that speed. The slight increase in speed does not result in an appreciable decrease in the output of the generator and substantially the maximum output is maintained.

Should the wind reach a tornado-like velocity and with the propeller turned out of the wind, if the direction of the wind suddenly changes it may happen that the generator is driven at a speed greatly in excess of the rated speed for a short period of time until the governor can again turn the impeller out of the wind. This is, however, not detrimental for, due to the characteristics of the third brush generator, the generator voltage is reduced when the generator is driven at an excess speed, with the result that the generator cannot be injured. The governor will turn the generator out of the wind into such a position that the wind will tend to drive the propeller at its rated speed and because of the flexing of the impeller tips there will be no tendency to operate above the rated speed due to the generator opposing torque having been reduced during the small period of time that the generator was operating above the rated speed.

It may, therefore, be seen that by providing a third brush generator connected to a high speed propeller and a governor for turning the impeller out of the wind I have devised an electric generating station that is not liable to destruction by excess voltages generated when the generator is driven at a very high speed by sudden gusts of winds of tornado velocity and, further, by the use of a flexible tip impeller the tendency of the third brush generator to permit the impeller to drive it at a speed above the rated speed due to the decreasing voltage characteristics of the generator is overcome.

Reference may now be made more particularly to Figs. 3 and 7 wherein the generator 4 is shown. Electrically the generator 4 is the usual third brush generator having a positive brush 30 and a negative brush 31. However, because of the fact that the generator is self-regulating there is no danger of having heavy currents flowing therethrough even for short intervals of time, as would result when the ordinary shunt type of generator is driven at high speeds. As a result it is possible to use finer armature wires and therefore more turns per slot. This permits the generator to attain the required voltage at a lower speed; hence the maximum output may be obtained during low winds, while the generator is effectively protected against burn-outs during high wind speed. The shunt field 33 is connected at one end to the third brush 32 and at the other end through a suitable fuse 34 to the positive brush 30. The panel board 36 is mounted at some convenient place so that replacement of the fuse or connections to the generator may be readily made.

Fig. 7 shows the mechanical arrangement of the armature and the generator casing, illustrating the manner of cooling the generator. The generator 4 includes a housing 40 in which the fields 33 are mounted and in which the armature 41 is journaled. The armature shaft 42 is journaled in the ball bearing 45 mounted in the bracket 46 which in turn is bolted to the housing 40. The bearing 45 is held in position by the locking member 48 which is secured to the bracket 46, and by a nut threaded to the shaft 42.

The armature shaft 42 extends through the housing and is provided with one or more slots for receiving the keys 49 that hold the impeller to the shaft. To lubricate the bearing the plate 48 is removed and a suitable lubricant is introduced into the bearing housing formed by the members 46 and 48.

The opposite end of the shaft 42 is journaled in a bearing comprising the outer race 55 and the inner race 56, the outer bearing cap 57 and the inner cap 58. The bearing is supported in a bracket 59 secured to the housing. The outer bearing cap is removed to lubricate the bearing. The brushes are held in suitable brush holders 61 secured to the brush yoke 60.

Bolted to the commutator end of the housing 40 is a housing 62 which is open at one end to receive the commutator and which closes that end of the generator housing. The housing 62 is provided with an air outlet 63 to which is secured the Venturi elbow 64. At the lower end of the housing 40 at the propeller end thereof is an air inlet 68 and an elbow 65. The elbow 65 is provided with a water trap consisting of a catch plate 66 and an opening 67 for discharging any moisture blown into the generator. The elbow 65 together with the elbow 62 constitutes excellent means for drawing air through the generator for cooling the same. Air moving in the direction of the arrow enters the elbow 65 where the moisture being thrown outwardly encounters the plate 66 and is ejected through the opening 67. The air travels through the casing and out through the elbow 62. The elbow 64 serves not only as an outlet for the air but also acts to draw air through the generator from the inlet 65, since the wind blowing outside of the venturi 62 produces a region of low pressure adjacent the opening and thereby draws air through the generator by suction. It is to be noted that the amount of air drawn through the generator will be a function of the wind velocity and a function of the angle that the opening in the elbows 62 and 65 make with the wind stream.

As the velocity of the wind increases there would ordinarily be a tendency to draw more air through the generator. To counteract this tendency it is to be noted that the generator is turned out of the wind as the wind speed increased beyond that necessary to drive the generator at its rated speed. The turning out of the wind tends to decrease the amount of air drawn through the generator. The net effect of the increased wind velocity and the turning of the generator out of the wind is to maintain the amount of air drawn through the generator substantially constant in ordinary winds. It may thus be seen that as long as the generator is operating at or below its rated speed and is headed straight into the wind the air drawn through the generator will be a function of the generator speed and therefore a function of the output and the heating of the generator. As the generator is turned out of the wind the amount of air drawn through the generator remains substantially constant as long as the generator is operating at its rated speed. If a sudden increase in wind velocity causes a sudden increase in the speed of the generator, there is a corresponding increase in the amount of air drawn through the generator for cooling it.

Figure 8 shows a modified form of my invention differing from Fig. 7 in that here there has been added a gear case and gear mechanism for driving the generator at a higher speed than the speed of the propeller. In so far as this generator is the same as the generator shown in Fig. 4, similar reference numerals have been used. In this form of my invention the armature shaft 42 extends through the generator casing as before, but has secured thereto a spur gear 70 in place of the propeller. Suitably bolted to the driving end of the generator 40 is a gear case 71 provided with a cover 72.

Mounted in the bearings 75 and 76 within the gear case is the impeller shaft 77 to which the impeller is suitably secured. A large gear 78 secured to the shaft 77 drives the pinion 70. A grease cup 80 is provided for introducing lubricant to the driving end of bearing 45. The gear 78 rotates in an oil bath within the casing 71. An oil shield 83 limits the splashing of the oil. The plug 82 is provided for draining the oil from the casing 71. A suitable paper or cork gasket is placed between the generator casing 40 and the housing 62 as well as between the gear case 71 and the generator housing 40 and the cover 72. This effectively seals the apparatus against the entrance of moisture.

When a two-bladed revolving impeller mounted on top of a supporting tower is turned out of the wind a bumping phenomenon is encountered. This consists of more or less severe bumping or shaking of the tower as a cantilever. The severity of the bumping or vibration of the tower is a function mainly of the speed of the impeller and also of the angle that the impeller has been turned out of the wind. The cause of this bumping is due, it is believed, to the fact that with the impeller turned out of the wind the blades offer a maximum and a minimum surface area to the wind twice during each revolution. In addition to this, and at the same time that the maximum surface of the impeller is exposed to the wind the force exerted by the wind on one of the blades is the maximum and on the other blade is the minimum. The magnitude of these forces is a function of both the speed of the impeller and of the angle that the impeller makes with the wind. The frequency of these impacts is a function of the impeller speed. There is, of course, one speed wherein the frequency of the impacts is resonant with the frequency of the tower. At this frequency the shaking of the tower becomes exceedingly objectionable. In wind operated impellers of this kind as heretofore used, when the impeller was turned out of the wind, its speed was reduced by such an amount that the frequency of the impacts as it decreased with the decreasing impeller speed passed through the natural frequency of the tower. At this point, the shaking of the tower became quite sever. The same thing occurred with even greater severity as the impeller was being turned back into the wind and being accelerated. The present structure overcomes the objectionable shaking of the tower such as results when impacts are being delivered thereto at the natural frequency of the tower. The design is such that the number of revolutions per second of the impeller is greatly in excess of half of the natural frequency of the tower. The design is such that even when the impeller has decelerated to its minimum speed upon being turned out of the wind by the wind vane, it is still operating above the speed necessary to produce impacts at the natural frequency of the tower. As a result of this construction, the tower is not subjected to violent bumping as the impeller is turned out of the wind. The blades, by their tendency to twist as they are turned back into the air stream, tend to further smooth out the impeller bumping or head tower rattling.

In compliance with the requirements of the patent statutes, I have herein described a preferred embodiment of my invention. It is, however, to be understood that my invention is not limited to the construction shown, the same being merely illustrative.

What I consider new and desire to secure by Letters Patent is:

1. A wind driven electric power plant comprising a low torque high speed impeller, a generator coupled thereto, said generator having a drooping voltage characteristic for increasing speeds beyond the rated speed, whereby the generator is protected against excessive voltages due to sudden gusts of wind, and a governor for turning the impeller out of the wind when the wind velocity exceeds that necessary to drive the generator at its rated speed, whereby the generator is maintained at its rated output during prolonged high wind periods.

2. A wind driven electric power plant comprising a low torque high speed impeller, a generator coupled thereto, said generator having a drooping voltage characteristic for increasing speeds beyond the rated speed, whereby the generator is protected against excessive voltage due to sudden gusts of wind, and a governor for turning the impeller out of the wind when the wind velocity exceeds that necessary to drive the generator at its rated speed, whereby the generator is maintained at its rated output during prolonged high wind periods, said impeller being flexible to oppose the tendency of the plant to increase in speed due to the decreasing opposing torque of the generator once the speed of the generator passes beyond its rated speed.

3. A wind driven electric power plant comprising a low torque high speed impeller, a generator coupled thereto, said generator having a drooping voltage characteristic for increasing speeds beyond the rated speed whereby the generator is protected against excessive voltages due to sudden gusts of wind, and a governor for turning the impeller out of the wind when the wind velocity exceeds that necessary to drive the generator at its rated speed, whereby the generator is maintained at its rated output during prolonged high wind periods, said impeller having flexible trailing tips which increase the starting torque of the impeller and which flex out of the plane of rotation of the impeller at winds in excess of that necessary to drive it at its rated speed, thereby opposing an increase in speed beyond the rated speed.

4. A wind driven electric power plant comprising a generator having the characteristic of decreasing its output as the speed exceeds the rated speed, and a flexible impeller for driving the generator, said impeller having the characteristic of flexing at an angle to its plane of rotation as the wind velocity increases beyond that necessary to drive it at its rated speed, whereby the impeller tends to oppose an increase in speed above the rated speed.

5. In a wind driven power generating plant, the combination of a wind wheel capable of operating at speeds in excess of the rated speed, means for absorbing the power of the wind wheel, said means having a decreasing torque as the speed exceeds the rated speed, and means effective when the wheel tends to operate at a speed in excess of the rated speed for turning the wheel at such an angle to the wind that the speed is maintained at the rated speed.

6. In a wind driven power plant, the combination with a high speed, low torque, wind operated impeller, power translating means for absorbing the power of the impeller, said means having a decreasing torque as the speed exceeds the rated speed, and a wind operated governor for maintaining the speed of the impeller at the rated speed when the wind velocity exceeds that necessary to drive the impeller at the rated speed.

7. In a wind driven electric power plant, a wind wheel, an electric generator driven thereby, said generator having a drooping voltage characteristic upon an increase in speed beyond the rated speed, whereby the generator is protected against excessive voltage due to sudden gusts of wind, and wind controlled means for turning the wind wheel at an angle to the wind to maintain the rated speed of the generator, whereby the maximum generator output is obtained during prolonged high winds.

8. In a wind driven electric generating power plant, the combination of a high speed wind driven impeller, a self-regulating generator having a drooping voltage characteristic as the speed exceeds the rated speed, and a tail vane governor for turning the impeller out of the wind when the speed tends to exceed the rated speed.

9. A wind driven electric generating power plant comprising a high speed screw impeller of the kind capable of being operated by the wind at speeds greatly in excess of the rated speed, and an electric generator having the characteristic of decreasing its output when operated at a speed above the rated speed.

10. In a wind driven electric generating power plant, the combination of a high speed screw impeller of the kind capable of being operated by the wind at speed greatly in excess of the rated speed, an electric generator having the characteristic of decreasing the output when operated at a speed above the rated speed, and a wind operated governor for turning the impeller out of the wind when the same tends to exceed the rated speed.

11. In a wind driven electric generating power plant, the combination with a generator of the kind wherein the field winding is electrically connected between one of the two main brushes of the generator and a third brush which is electrically connected between the main brushes, of a wind driven prime mover of the high speed helical screw type.

12. A wind driven electric power plant comprising a low torque high speed wind wheel, a generator coupled thereto, said generator being self regulating for substantially zero output at speeds below a predetermined speed, whereby a rapid starting of the wind wheel at low winds is obtained, said generator having a drooping voltage characteristic for increasing speeds beyond the rated speed, whereby the generator is protected against excessive voltage due to sudden gusts of wind.

13. A wind driven electric power plant comprising a low torque high speed wind wheel, a generator coupled thereto, said generator being self regulating for substantially zero output at speeds below a predetermined speed, whereby a rapid starting of the wind wheel at low winds is obtained, said generator having a drooping voltage characteristic for increasing speeds beyond the rated speed, whereby the generator is protected against excessive voltage due to sudden gusts of wind, and regulating means for maintaining the rated speed during high winds, whereby the rated generator output is maintained.

14. A wind electric power plant comprising a high speed low torque two bladed impeller, a third brush generator driven thereby, and a governor for turning the impeller out of the wind.

15. A wind electric power plant comprising a two bladed flexible propeller arranged to be flexed at an angle to its plane of rotation when driven by a wind in excess of that necessary to drive it at its rated speed, a third brush generator driven by the impeller, and a governor for turning the impeller out of the wind.

In witness whereof, I hereunto subscribe my name this 16th day of August, 1928.

H. E. BUCKLEN.